United States Patent [19]
>
> Robinson, Jr.
>
> [11] 4,213,264
>
> [45] Jul. 22, 1980

[54] AUTOMATIC FISHING APPARATUS

[76] Inventor: James W. Robinson, Jr., 109 Lake Mead Dr., Henderson, Nev. 89015

[21] Appl. No.: 952,713

[22] Filed: Oct. 19, 1978

[51] Int. Cl.³ ............................................. A01K 91/06
[52] U.S. Cl. .......................................... 43/16; 43/17
[58] Field of Search ................... 43/15, 16, 17, 17.5, 43/21.2

[56] References Cited

U.S. PATENT DOCUMENTS

| | | | |
|---|---|---|---|
| 2,908,099 | 10/1959 | Burke | 43/16 |
| 2,996,824 | 8/1961 | Faycosh | 43/16 |
| 3,055,135 | 9/1962 | Lewis | 43/15 |
| 3,284,943 | 11/1966 | Wedel | 43/15 |
| 3,475,847 | 11/1969 | Wilson | 43/15 |
| 3,571,963 | 3/1971 | Ledbetter | 43/16 |
| 3,914,894 | 10/1975 | Kobza | 43/15 |
| 4,031,651 | 6/1977 | Titze | 43/15 |

Primary Examiner—Nicholas P. Godici
Assistant Examiner—Robert P. Olszewski
Attorney, Agent, or Firm—Seiler & Quirk

[57] ABSTRACT

Automatic fishing apparatus has a rod-holding tube concentrically mounted in a pivoted sleeve which is biased toward an armed position. A solenoid-actuated latch maintains the sleeve in the armed position. The tube is separately biased in the sleeve to permit movement of the tube against a trigger which actuates the solenoid. A calibration circuit permits adjustment of bias on the tube when the tube is in the cocked position.

7 Claims, 6 Drawing Figures

AUTOMATIC FISHING APPARATUS

BACKGROUND OF THE INVENTION

1. Field of the Invention

This invention relates to automatic fishing apparatus for holding an individual fishing rod which instantaneously jerks the rod upward when a fish exerts a pull on the line, thereby setting the hook in the mouth of the fish. More particularly, the invention relates to an electrically actuated fishing rod holder which has a wide scope of adjustment for use with various sized and weight fishing poles, and also has an extremely accurate and easy-to-use calibration mechanism.

2. Description of the Prior Art

The patent literature is replete with devices to assist the fisherman in automatically hooking a fish. Many of these devices comprise a rod-holding tube which is pulled against a spring to a cocked position and is held in place by a trigger catch. The action of the fish biting on the hook releases the trigger, and the spring jerks the rod back, engaging the hook in the mouth of the fish. A basic example of such a device is shown in Timmons, U.S. Pat. No. 3,881,269, which also features an adjustable spring mount which permits variation of the tension on the spring which actuates the rod holder. Adjustment is achieved by sliding a carriage locking means which is attached to one end of the spring to any of a series of positions on the device. A similar device having dual springs also provides for a variable tension by moving the end of one of the springs to any of a plurality of different support locations; this apparatus is described in Titze, U.S. Pat. No. 4,031,651.

A number of other patents also show a spring actuated, rod holding tube having a biased trigger which is released by a pulling action on the rod. Many of these patents also show mechanical adjustments of the spring tension needed to move the rod from the cocked to the released position, and of the tension on the fish line required to release the trigger. Examples of these devices are disclosed in Wedel, U.S. Pat. No. 3,284,943; Hughes, U.S. Pat. No. 2,821,041; DalBianco, U.S. Pat. No. 3,834,055; Burke, U.S. Pat. No. 2,908,099; DeMino, U.S. Pat. No. 3,777,389; and Biddison, U.S. Pat. No. 3,154,875. Many of these devices also have means for alerting fisherman when the device is triggered, such as a light or buzzer.

An electrically actuated accessory for setting a hook is described in Ledbetter, U.S. Pat. No. 3,571,963. This device comprises a frame which holds the entire fishing rod from handle to tip having a solenoid actuated by a metal spring which is responsive to bending of the tip of the rod by a fish tugging on the line. The armature of the solenoids strikes the tip of the rod, moving the tip upwardly and setting the hook. Since the Ledbetter frame must carry an entire fishing rod, it is somewhat bulky and not easily portable. A more complex electrical fishing device is shown in Nishi et al, U.S. Pat. No. 3,813,806. This patent discloses an automatic fishing device which detects a fish on the line and rotates the reel automatically to pull in the fish.

It has been found that the sensitivity adjustments and triggering mechanisms on mechanical devices frequently become inaccurate and non-reproduceable over a period of time. Normal corrosion and exposure of the metal parts to sea water will cause the spring catches and trigger mechanisms to stick or to require a much stronger pull on the line for actuation, thereby resulting in the loss of some catches. In addition, most of the devices of the prior art are adjustable only within a small range of tension, and are not useful for both light fresh-water rods and heavy salt-water rods.

Accordingly, the present invention provides an automatic fish hooking apparatus having an electrically actuated trigger mechanism with a finely adjustable release tension. It is another object of the invention to provide a fishing apparatus which is adjustable over a wide range to accommodate very light fishing poles and very sturdy poles, without losing sensitivity or accuracy. It is another object of the invention to provide a fishing apparatus which can be easily calibrated and adjusted after cocking, so that the user can determine the precise pull on the fishing line which will trigger the apparatus without retracting the fishing pole. These and other objects of the invention will be apparent and are accomplished by the apparatus of the invention, a specific embodiment of which is described herein.

SUMMARY OF THE INVENTION

Automatic fishing apparatus comprises a housing, a pivotally mounted tube for holding a fishing rod, a pivotally mounted sleeve concentric to said tube, said tube and said sleeve being movable between an armed position and a released position, spring means for biasing the sleeve toward the released position, latch means for maintaining the sleeve in the armed position, trigger means for releasing the latch means responsive to a predetermined force on the fishing rod, and calibrations means for determining the force required to actuate the trigger means.

BRIEF DESCRIPTION OF THE DRAWINGS

The invention is best understood with reference to the drawings, in which.

DETAILED DESCRIPTION OF THE INVENTION

Figure 1:
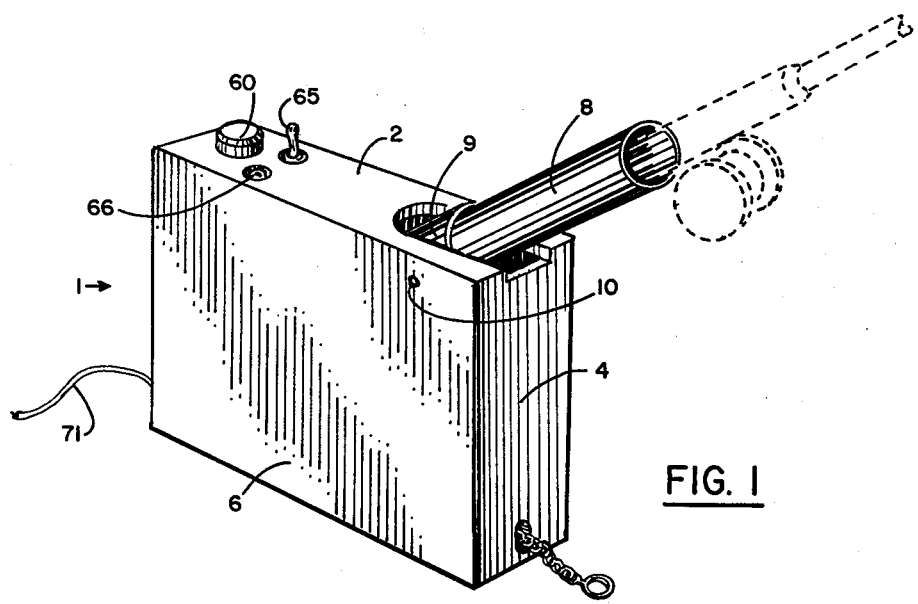
FIG. 1 is a perspective view of the apparatus of the invention showing a fishing rod in phantom mounted therein.

Referring to the drawings, automatic fishing apparatus 1 is generally encased in a container having upper wall 2, floor 3, front and rear walls 4 and 5, respectively, and side walls 6 and 7. A rod holding tube 8, with a fishing rod being shown contained therein in phantom in FIG. 1, extends through an opening in upper wall 2 of the apparatus. A concentric sleeve 9 of slightly greater diameter than the rod holding tube is mounted around the bottom portion of the tube; both the tube 8 and sleeve 9 are pivotally mounted in the apparatus by pin 10, which extends through the center of tube 8, sleeve 9, and through holes in the walls 6 and 7.

Figure 2:
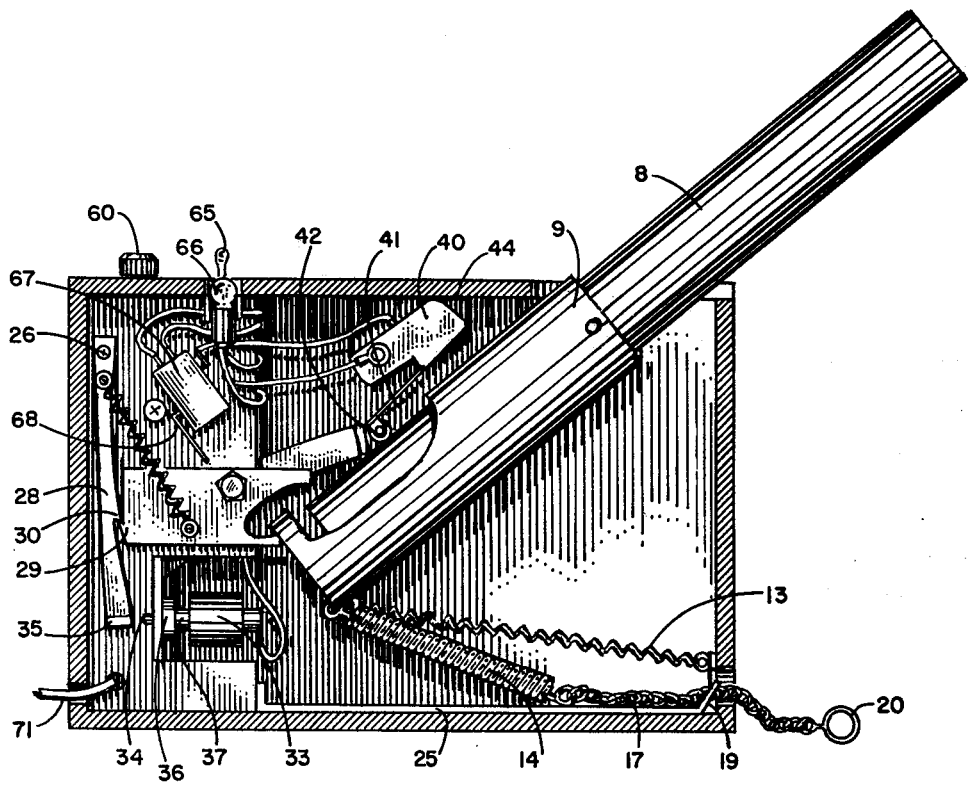
FIG. 2 shows a side elevational view thereof sectioned just inside one wall, with the apparatus in cocked position.
Figure 3:
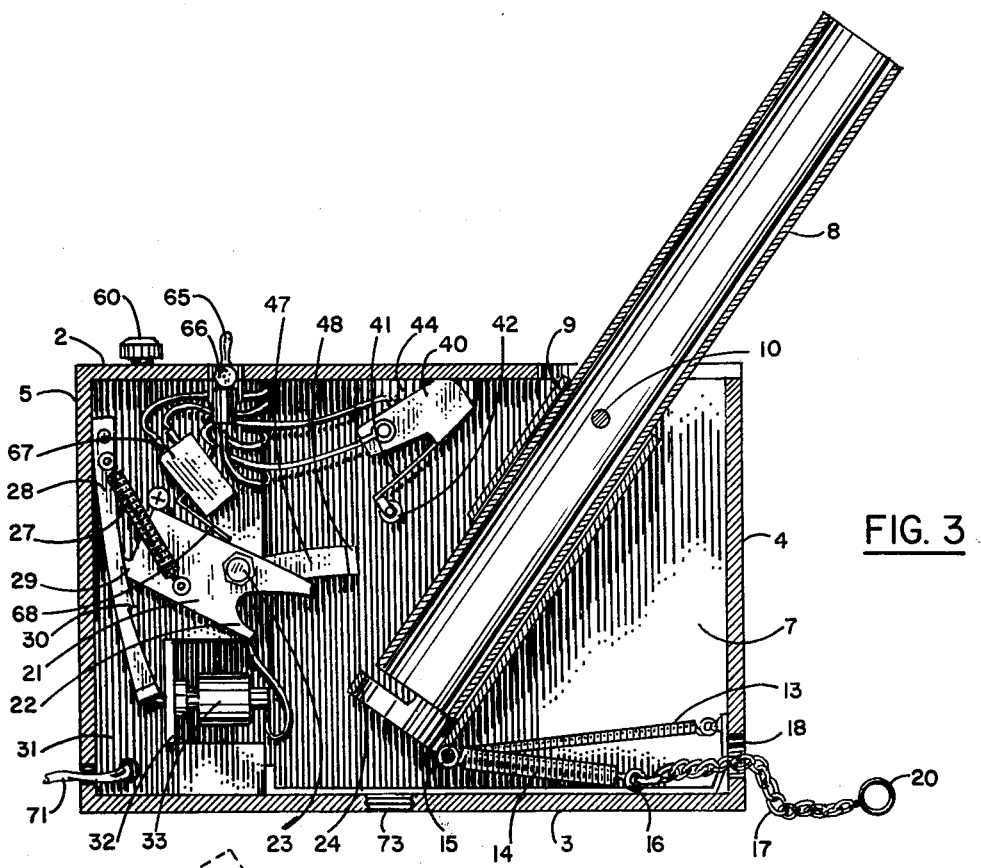
FIG. 3 is a view similar to FIG. 2 with the device in released position.
Figure 4:
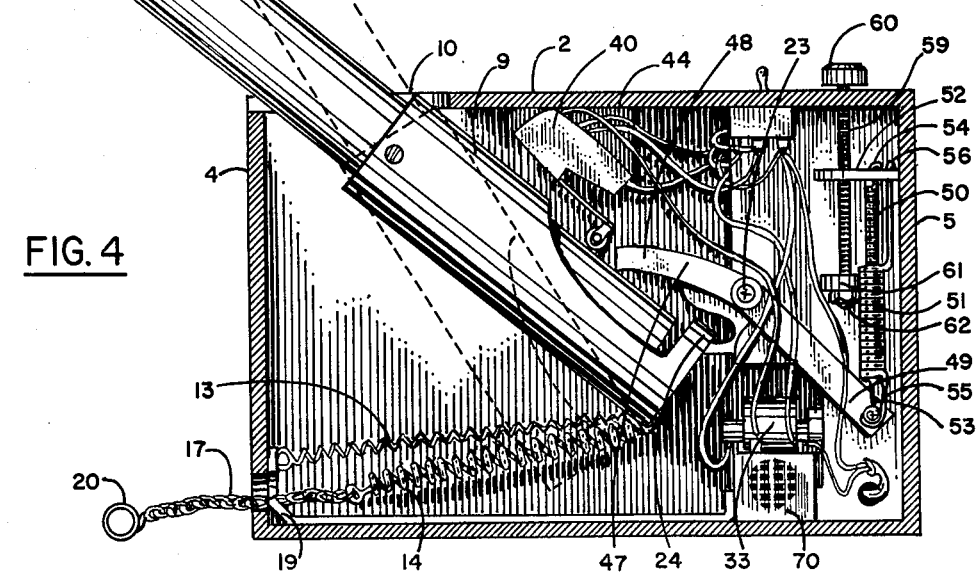
FIG. 4 is a side elevational view sectioned just inside the opposite wall, with the device in cocked position.

Rod mounting tube 8 and sleeve 9 pivot back and forth between an armed position, as shown in FIGS. 2 and 4, and a released position, shown in FIG. 3 and, in phantom, in FIG. 4. The tube and sleeve are biased towards the released position by a pair of coil tension springs 13 and 14. Spring 13 has a relatively low spring constant and is attached between the front wall 4 and the bottom portion of the sleeve. Coil spring 14 has a relatively high spring constant, and is attached to the base of the sleeve by means of a ring 15 at the end of the spring which extends through a bore in the sleeve. The other end 16 of spring 14 is attached to a link chain 17 terminating in pull ring 20 which serves as a means of adjustment of tension on spring 14. The chain extends through an aperture 18 and the bottom portion of the front wall 4 of the casing, and is held in place by sliding the chain links downwardly into the notch formed by a v-shaped fork 19 located just inside aperture 18.

As the rod-holding tube is pivoted from the released to the armed position, tension spring 13 is stretched, biasing the bottom of the sleeve toward the released position. Depending on the location of chain 17 in notch 19, spring 14 may also be stretched, thereby increasing the tension on the sleeve. FIG. 2 shows the unit in armed position with all of the tension being applied by spring 13; FIG. 4 shows the unit in armed position with tension being applied by both springs 13 and 14. For use with light fishing rods, spring 14 need not be used. However, when fishing for large fish or trolling with large lures, both springs would be employed. The heavy spring 14 is adjustable by aligning the links 17 in the notch 19, thereby permitting a wide variation in springback tension. The action of the rod being pulled back to hook a fish is created by springs 13 and 14 pulling on the bottom of the sleeve, which in turn pulls the rod holding tube backwardly. When the tube is snapped backwardly, the end of the sleeve 9 hits striker plate 25, which terminates the travel of tube 8.

The sleeve 9 is maintained in the armed position by a catch 21 pivotally mounted on pin 23 on a vertical mounting plate 31 centrally located within the apparatus. The catch has a lip 22 which engages the end portion 24 at the bottom end of the sleeve 9. The catch is pulled away from the end of the sleeve by coil spring 27, which operates between catch 21 and the upper portion of vertical lever arm 28. As shown in FIG. 2, a tooth 29 at the rear of the catch engages a similar tooth 30 on the vertical lever arm, thereby maintaining the catch in a cocked position. The lever arm is also mounted on vertical mounting plate 31, and pivots around pivot mount 26.

A solenoid 33 is mounted on lateral boss 32 extending outwardly from the mounting plate. Upon actuation of the solenoid, the armature 34 (see FIG. 2) is thrust outwardly, striking the foot 35 at the bottom portion of lever arm 28. The solenoid is mounted on the boss by a threaded shaft 37 which screws into a correspondingly threaded opening (not shown) in boss 32. A threaded nut 36 is used to maintain the solenoid in place.

The solenoid is actuated by a microswitch 40 having a movable switch arm 41 terminating in a wheel contact 42. The wheel rides on the upper surface of the lower portion of rod holding tube 8, as shown in FIGS. 2 and 4, when the apparatus is in the cocked position. The microswitch is actuated by a slight downward movement of the forward portion of rod holding tube 8, corresponding to a fish biting on the line. When the unit is in the cocked mode, the rod holding tube 8 can rock slightly backward and forward inside sleeve 9, even though the sleeve is held firmly in place by catch 21.

The tension on the rod which is necessary to actuate the apparatus is also very finely adjustable. The foot 48 of a lever arm 47, pivotally mounted around pin 23, exerts a downward force on the end of tube 8 as shown in FIGS. 2 and 4, imparting resistance to movement of the tube against the microswitch wheel 42. A pair of concentrically mounted tension springs 50 and 51 are connected to the other end of lever arm 47, urging the foot 48 downwardly against rod holding tube 8. Spring 50 has a relatively low spring constant whereas spring 51 is relatively stiff, being used only when fishing for larger fish or when trolling. Both springs are mounted between the lever arm 47 and a floating mounting plate 52, with terminal wires 53 and 55 at the ends of the springs being attached to the lever arm, and terminal wires 54 and 56 being extended through openings in the mounting plate and hooked thereon. The floating mounting plate 52 moves vertically along the threaded shaft 59 which threadedly engages the plate. The shaft is mounted on a fixed boss 61 which extends out horizontally from vertical plate 31. Shaft 59 extends through an aperture in the boss and is held in place by nut 62. Shaft 59 extends through an opening in the top wall 2 and terminates in a knob 60, which is used to manually rotate the shaft. As the knob 60 is rotated in a clockwise direction, the floating plate travels upwardly, first extending spring 50. Spring 51 is not initially extended, with wire 56 on the end thereof sliding through a hole in the floating plate. As the plate rises, the tension on the lever arm increases, and the force exerted by foot 48 on the tube 8 at the other end of the lever arm also increases. As the floating plate continues to rise, heavy spring 51 is also extended, thereby increasing the force of the lever arm on tube 8 very substantially. Accordingly, by tightening or loosening the pair of tension springs 50 and 51, the force of the tug exerted by a fish on the line necessary to trigger microswitch 40 can be varied along an extremely wide range of sensitivity.

The electrical circuitry embodied in the apparatus of the invention also includes means to alert the fisherman when the microswitch is tripped. A light 66 is visually perceptible, and a buzzer 70 is also actuated. The alert mechanisms are operated by a microswitch 67 mounted on plate 31 which has a short, downwardly extending lever arm 68. When the solenoid is actuated and the catch released, the catch moves from the position shown in FIG. 2 to the position shown in FIG. 3, with the upper edge of catch 21 contacting lever arm 68 of the microswitch, actuating the switch and the alert means.

A very important feature of the invention is the mechanism for calibrating the sensitivity of the device after it is cocked. A toggle switch 65 at the top of the apparatus is movable between an "operate" position and a "calibrate" position. When the switch is moved to the "calibrate" position, light 66 is illuminated, and the buzzer is electrically connected to microswitch 40. To calibrate the apparatus, the device is first cocked by the user placing his hand on the end of tube 8 and pressing downwardly and forwardly, lifting the rear portion of tube 8 and sleeve 9, and engaging the lip 24 on sleeve 9 with the catch 21. The device then assumes the position shown in FIGS. 2 and 4. The toggle switch is placed in the "calibrate" position, and the fishing rod is inserted in the tube 8, the butt of the fishing rod extends in the tube until it rests on the pivot pin 10, or until the reel mounting bracket engages the upper end of the tube. Next, the user pulls downwardly on the rod, causing the tube 8 to rock within the sleeve 9, and to move upwardly against the wheel 42 of microswitch 40. After the wheel is moved a small distance, the switch closes, and the buzzer sounds. If too much or too little pressure is required on the rod to actuate the switch, the user adjusts the resistance on the bottom of tube 8 accordingly by turning the knob 60 clockwise or counterclockwise. After the adjustment is made, the process is repeated, until the tension expected to be exerted by a fish on the line is matched to the resistance on the triggering mechanism. This sensitivity adjustment permits the fisherman to very carefully adjust the trigger so that unpredictable water currents or light nibbles on the line will not actuate the mechanism, but that an actual bite on the line will not be lost. After the adjustment is complete, the toggle switch is moved to the "operate" position, thereby placing the solenoid electrically in the circuit. When the toggle switch is moved to the "operate" position, the light is extinguished, thereby indicating that the device is ready for use.

The apparatus of the invention is particularly useful when trolling from a boat. First the toggle switch is placed in the "calibrate" position with the light on, and the rod is placed in the holding tube. The fishing line is released with the desired bait attached, and the line is played out to the desired trolling length and secured. If the audio alarm sounds during any of the time that the trolling is occurring, the sensitivity adjusting knob 60 is turned clockwise until the alarm stops and then is turned further about 5 to 10 more turns to allow for more extreme variations in the line pressure. After the adjustment is made, the switch is then moved to the "operate" position.

The device may be anchored to the ground, if desired, by a stake (not shown) which screws into threaded fitting 73 on the bottom of the device.

Power is supplied to the apparatus by means of a line 71 extending from a source of DC power (not shown). If available, AC power may also be used. Power is conveniently supplied through a 12 volt lantern battery mounted on the outside of the apparatus. Alternatively, a 15 volt Ni/Co battery can be mounted inside the front wall 4 of the casing, and is therefore totally internally contained within the device.

Figure 6:
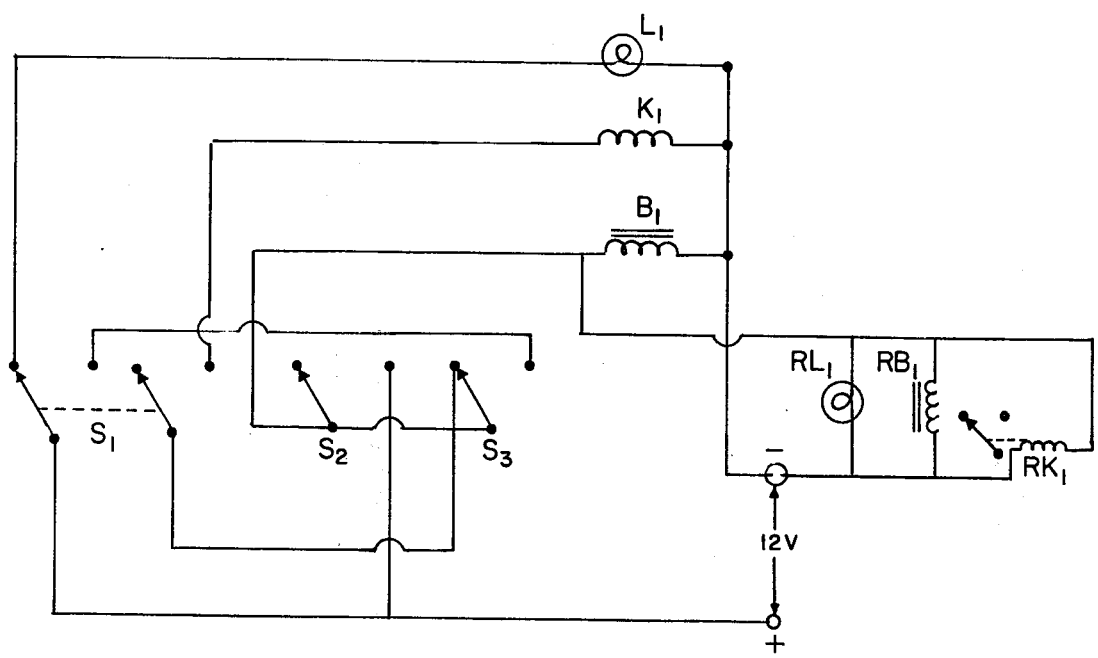
FIG. 6 is a circuit diagram of the calibration and alert mechanisms of the invention.

An electrical circuit diagram for the unit as shown in the drawings is illustrated in FIG. 6, with the exception that a remote alert system is also shown in the circuit diagram. In the drawing, $S_1$ represents toggle switch 65, $S_2$ represents the trigger microswitch 40, and $S_3$ represents microswitch 67. With the toggle switch in the "calibrate" position (as shown in FIG. 6), light $L_1$ is connected to the power source. The buzzer is connected to the power source only when switch $S_2$ is closed. With the toggle switch in the "operate" position, the solenoid $K_1$ is placed in the circuit and is actuated when trigger switch $S_2$ is closed. Also shown in FIG. 6 are a remote light $RL_1$, a remote alarm buzzer $RB_1$, and a remote relay $RK_1$ which can be used to alert the fisherman at a distance from the apparatus, for example if he wishes to be alerted while resting in a car, recreational vehicle, or the like to escape the elements. If desired, the signal can easily be wired to stop the engine or propellors on a boat. These remote units are of course optional.

Figure 5:
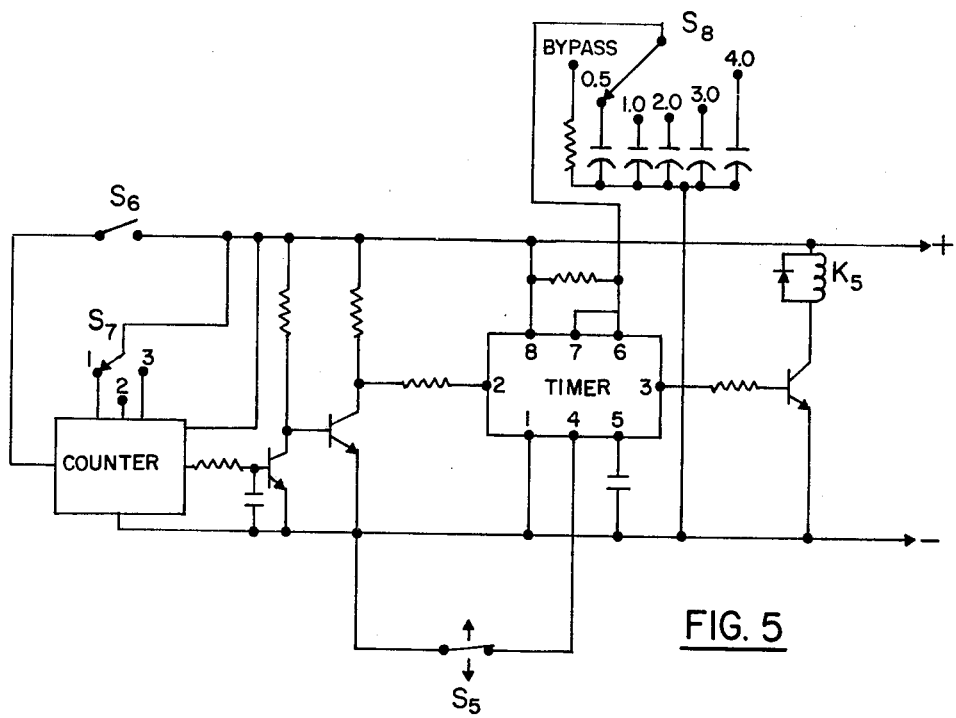
FIG. 5 is an electrical circuit diagram of an embodiment of the invention wherein the trigger releases only after a certain period of time has elapsed after the fish has first contacted the hook.

The invention contemplates a number of modifications which may increase the effectiveness of the fish catching apparatus described herein. Several of these modifications are illustrated in electrical circuit diagram FIG. 5. By rather simple modifications of the electrical circuitry, the apparatus can be designed to release the trigger mechanism only after a certain period of time has elapsed after the fish first hits the line, and/or only after the fish has exerted a plurality of pulls on the line. For example, many fishermen feel that if the pole is jerked backwardly immediately upon the first sensing of a fish at the hook, the hook will not set properly and the fish will get away. Accordingly, a strike counter circuit actuated by the closing of switch $S_6$ places a counting mechanism in the circuit having a switch $S_7$ which can be manually adjusted to require 1, 2, or 3 strikes on the line prior to firing of the trigger. The timer may be adjusted with switch $S_8$ to any of a plurality of settings from 0.5 seconds to 4.0 seconds. The timer is actuated by the first strike, and delays the firing of the trigger mechanism for the selected period of time. The timer may be bypassed by the appropriate setting of switch $S_8$.

I claim:

1. Automatic fishing apparatus comprising a housing, a pivotally mounted rod-holding tube, a pivoted sleeve mounted substantially coaxially to the tube and movable relative thereto, the tube and sleeve being movable between a cocked position and a released position, first biasing means for urging the sleeve toward the released position, latch means for maintaining the sleeve in the cocked position, second biasing means for urging the rod-holding tube into the released position, and trigger means actuated by movement of the rod-holding tube to release the latch means.

2. The apparatus of claim 1 also comprising adjustment means for varying the force of the first biasing means.

3. The apparatus of claim 1 also comprising adjustment means for varying the force of the second biasing means.

4. The apparatus of claim 1 wherein the trigger means comprises electric switch means actuated by a movement of the rod-holding tube toward the cocked position, and a solenoid electrically connected to the electric switch means for actuating the latch means.

5. In an automatic fishing apparatus having fishing rod-holding means movable between a cocked position and a released position, biasing means for urging the rod-holding means toward the released position, latch means for retaining the rod-holding means in the cocked position, trigger means responsive to a pull on the fishing line, and adjustment means for varying the force exerted on the fishing line required to actuate the trigger means, the improvement therein which comprises calibration means for determining the force required to actuate the trigger means, said calibration means comprising switch means for preventing actuation of the latch means during calibration, electrical circuit means including sensing means for determining the force on the fishing line required to actuate the trigger means, and first alert means responsive to the sensing means to indicate when a force sufficient to actuate the trigger means has been reached, the switch means having a first calibration position wherein the trigger means is connected to the first alert means and disconnected with the latch means, and a second armed position wherein the trigger means is connected to the first alert means and to the latch means.

6. The improvement of claim 5 also comprising release means for actuating the latch means responsive to an electrical signal, and switch means having a first calibration position and a second armed position, said switch means electrically disconnecting said release means when in the calibration position.

7. The improvement of claim 6 also comprising second alert means for indicating whether the switch means is in the calibration position or the armed position.

* * * * *